(12) United States Patent
Eber et al.

(10) Patent No.: US 9,172,463 B2
(45) Date of Patent: Oct. 27, 2015

(54) SYSTEMS, METHODS AND DEVICES FOR DETECTING INFRARED NOISE AT A REMOTE CONTROL

(75) Inventors: Samuel Eber, Denver, CO (US); Eric Hieb, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 206 days.

(21) Appl. No.: 12/900,830

(22) Filed: Oct. 8, 2010

(65) Prior Publication Data

US 2012/0087671 A1   Apr. 12, 2012

(51) Int. Cl.
*H04B 10/00*     (2013.01)
*H04B 10/114*    (2013.01)

(52) U.S. Cl.
CPC .................. *H04B 10/1143* (2013.01)

(58) Field of Classification Search
USPC .................................................. 398/107, 106
See application file for complete search history.

(56) References Cited

U.S. PATENT DOCUMENTS

| | | | | |
|---|---|---|---|---|
| 5,778,077 | A * | 7/1998 | Davidson | 381/57 |
| 6,049,294 | A * | 4/2000 | Cho | 340/13.23 |
| 7,194,209 | B1 * | 3/2007 | Robbins et al. | 398/127 |
| 7,266,301 | B2 * | 9/2007 | Stanchfield et al. | 398/126 |
| 7,359,448 | B2 * | 4/2008 | King et al. | 375/268 |
| 7,711,269 | B2 * | 5/2010 | Grace | 398/106 |
| 7,746,245 | B2 * | 6/2010 | Park et al. | 340/12.3 |
| 7,938,702 | B2 * | 5/2011 | Suzuki et al. | 440/1 |
| 8,154,381 | B2 * | 4/2012 | Kohanek | 340/3.71 |
| 8,180,352 | B2 * | 5/2012 | Nordmark et al. | 455/445 |
| 8,244,136 | B2 * | 8/2012 | Garner et al. | 398/106 |
| 8,314,729 | B2 * | 11/2012 | Maier | 341/176 |
| 8,463,128 | B2 * | 6/2013 | Perret-Gentil | 398/106 |
| 8,723,655 | B2 * | 5/2014 | Maier | 340/12.22 |
| 2003/0005462 | A1 * | 1/2003 | Broadus et al. | 725/110 |
| 2005/0047794 | A1 * | 3/2005 | Quintanar | 398/149 |
| 2006/0284841 | A1 * | 12/2006 | Hong et al. | 345/157 |
| 2007/0140697 | A1 * | 6/2007 | Miyake et al. | 398/106 |

(Continued)

FOREIGN PATENT DOCUMENTS

| | | | |
|---|---|---|---|
| JP | 2004336261 A | * | 11/2004 |
| JP | 2006278060 A | * | 10/2006 |

OTHER PUBLICATIONS

Eber, Samuel "Apparatus, Systems and Methods for Compensating Infrared Noise in an Electronic System," U.S. Appl. No. 12/643,602, filed Dec. 21, 2009.

(Continued)

*Primary Examiner* — Ken Vanderpuye
*Assistant Examiner* — Amritbir Sandhu
(74) *Attorney, Agent, or Firm* — Ingrassia Fisher & Lorenz, P.C.

(57) ABSTRACT

Systems, devices and methods provide feedback about the quality of communication between a device and a remote control. A wireless signal is sent between a controlled device and the remote control. The quality of the signal can be measured and reported to a user, installer, troubleshooter, customer service agent or other person in any manner. Quality may be determined based upon the strength of the received signal as well as the amount of noise that is present. The quality measurements provide feedback that allows a user, installer, customer service representative or other person to change the positions of the device or the remote control, or to take other actions based upon the quality of the wireless signal that is received.

16 Claims, 2 Drawing Sheets

(56) References Cited

U.S. PATENT DOCUMENTS

Figure 1:
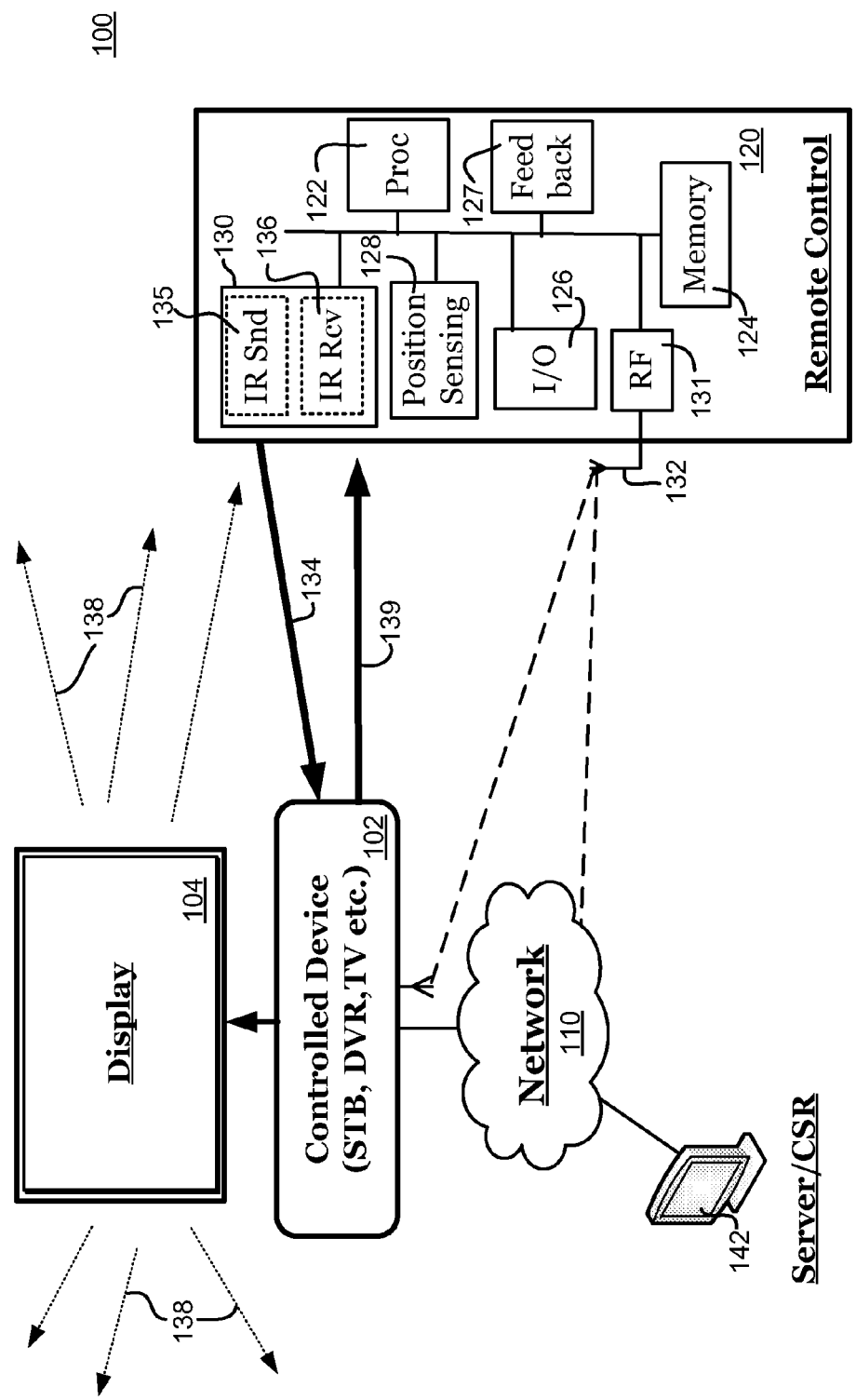

| | | | |
|---|---|---|---|
| 2007/0290883 A1* | 12/2007 | Kuboyama | 340/825.72 |
| 2007/0290884 A1* | 12/2007 | Ishimoto et al. | 340/825.72 |
| 2009/0027336 A1* | 1/2009 | Lin et al. | 345/158 |
| 2009/0136231 A1* | 5/2009 | Lai | 398/112 |
| 2009/0202250 A1* | 8/2009 | Dizechi et al. | 398/107 |
| 2009/0215336 A1* | 8/2009 | Suzuki et al. | 440/86 |
| 2009/0245803 A1* | 10/2009 | Garner et al. | 398/106 |
| 2009/0245804 A1* | 10/2009 | Garner et al. | 398/106 |
| 2009/0248515 A1* | 10/2009 | Seidel et al. | 705/14 |
| 2010/0277653 A1* | 11/2010 | Liao et al. | 348/734 |
| 2010/0332979 A1* | 12/2010 | Xu et al. | 715/704 |
| 2011/0052213 A1* | 3/2011 | Herlein et al. | 398/202 |
| 2011/0112780 A1* | 5/2011 | Moss | 702/62 |
| 2011/0128228 A1* | 6/2011 | Van der Byl | 345/167 |
| 2011/0140867 A1* | 6/2011 | Maier | 340/12.22 |
| 2011/0269502 A1* | 11/2011 | Clark et al. | 455/552.1 |
| 2012/0113329 A1* | 5/2012 | Lin | 348/744 |
| 2012/0206050 A1* | 8/2012 | Spero | 315/152 |
| 2013/0070946 A1* | 3/2013 | Kroman | 381/315 |
| 2013/0156434 A1* | 6/2013 | Hsieh et al. | 398/106 |
| 2014/0295811 A1* | 10/2014 | Uusitalo et al. | 455/416 |

OTHER PUBLICATIONS

Anthony Kozlowski "Signal Strength Detection," U.S. Appl. No. 12/511,755, filed Jul. 29, 2009.

Anthony Kozlowski et al. "Systems, Methods and Devices for Providing Feedback About a Quality of Communication Between a Device and a Remote Control," U.S. Appl. No. 61/320,637, filed Apr. 2, 2010.

\* cited by examiner

SYSTEMS, METHODS AND DEVICES FOR DETECTING INFRARED NOISE AT A REMOTE CONTROL

TECHNICAL FIELD

The following discussion generally relates to infrared communications using a remote control, and more particularly relates to systems, devices and methods for detecting infrared noise at a remote control.

BACKGROUND

Many remote controls transmit commands to any number of different types of devices using infrared light. Televisions, media players, set-top boxes (including satellite and/or cable television receivers), audio/video components, climate controls and many other products are designed to respond to user commands provided via remote controls. Television viewers, for example, commonly use remote controls to adjust volume, to select programming, and/or to direct any number of other actions by their televisions or television receivers.

Remote controls typically encode commands issued by the user into infrared signals that are wirelessly transmitted to the controlled device. The controlled device receives and decodes the command encoded within the IR signal. This command can then be executed by the controlled device (e.g., to adjust volume, channel or other settings of a television).

Often, however, other sources of infrared light can interfere with the control signals produced by an infrared remote control. Certain types of flat panel television displays, for example, can produce spurious infrared light in the vicinity of the remote control or the receiver that can cause command signals to be lost or corrupted. Other sources of infrared light (e.g., lamps, heaters, fluorescent lights, etc.) can also produce noise that can interfere with infrared remote control signals in certain environments.

It is therefore desirable to improve the operation of infrared remote controls in environments where infrared noise is present. These and other desirable features and characteristics will become apparent from the subsequent detailed description and the appended claims, taken in conjunction with the accompanying drawings and this background section.

BRIEF SUMMARY

According to various exemplary embodiments, systems, devices and methods are provided to detect the presence of infrared noise at a remote control and to take appropriate action when noise is detected.

An exemplary embodiment may be executed by a processor that controls the operation of an infrared remote control. The method suitably comprises measuring infrared light received at the infrared remote control, analyzing the measured infrared light at the infrared remote control to identify noise in the measured infrared light, and adapting the transmission of an infrared command signal transmitted by the infrared remote control in response to the noise in the measured infrared light.

Another exemplary embodiment may be executed by a processor that controls the operation of a remote control that provides infrared command signals to a controlled device. The method suitably comprises measuring infrared light received at the remote control, analyzing the measured infrared light at the remote control to identify noise in the measured infrared light, and transmitting a signal to the controlled device, wherein the signal is responsive to the noise in the measured infrared light.

Another exemplary embodiment may provide a remote control configured to provide infrared command signals to a controlled device. The remote control suitably comprises an infrared transmitter configured to generate the infrared command signals, an infrared receiver configured to detect infrared light, and a processor coupled to the infrared transmitter and the infrared receiver. The processor is configured to identify noise in the infrared light detected by the infrared receiver and to adapt the infrared command signals generated by the infrared transmitter in response to the noise in the infrared light detected by the infrared receiver.

These and other embodiments, aspects and other features are described in more detail below.

BRIEF DESCRIPTION OF THE DRAWING FIGURES

Figure 2:
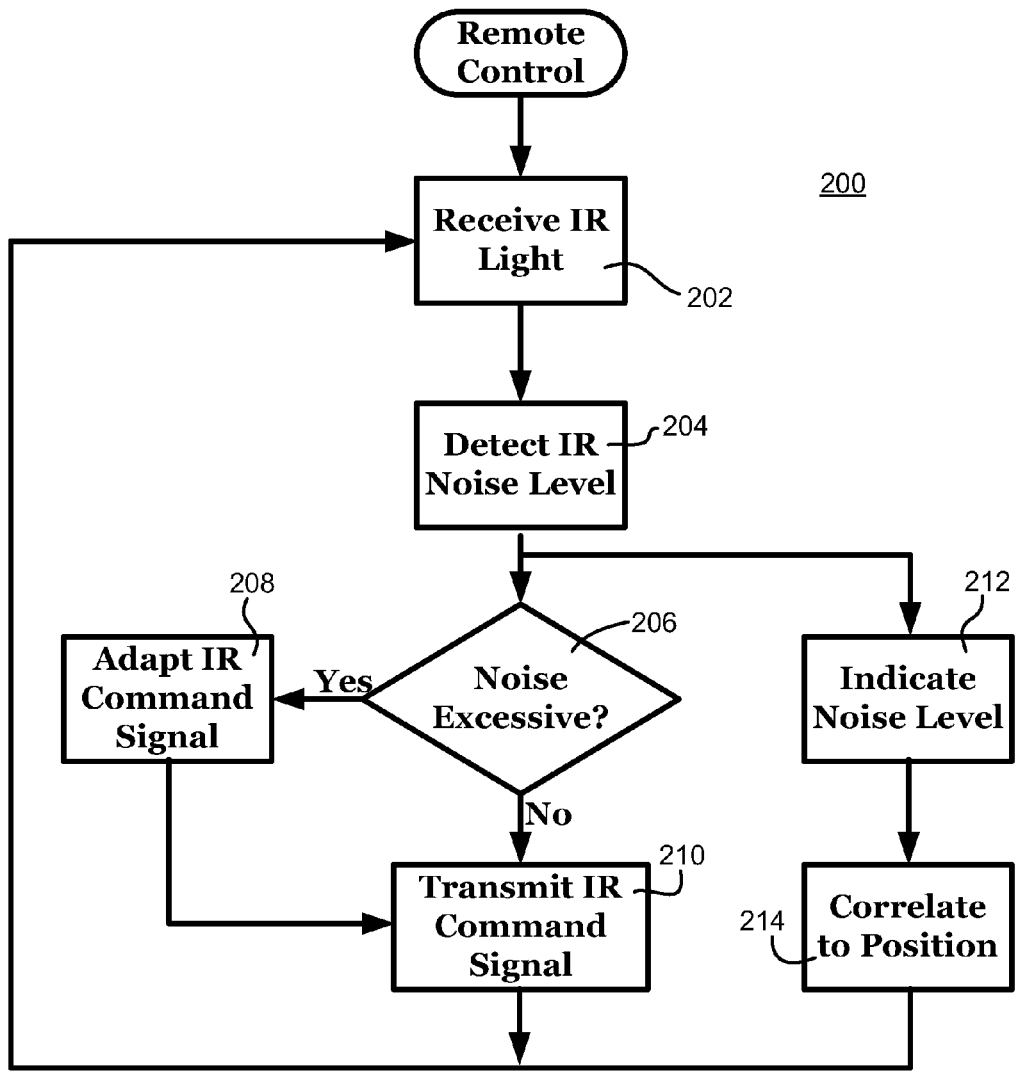

Exemplary embodiments will hereinafter be described in conjunction with the following drawing figures, wherein like numerals denote like elements, and FIG. 1 is a block diagram of an exemplary system that supports detection of infrared noise by a remote control; and FIG. 2 is a flowchart of an exemplary method for operating a remote control.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, systems, devices and methods are provided to detect the presence of infrared noise at a remote control and to take appropriate action when noise is detected. Some embodiments may, for example, automatically adapt the operation of the remote control when IR noise is detected by increasing the transmit power of infrared command signals when noise is present, by transmitting the infrared commands at a time when the IR noise is not present, by selecting an operating frequency that is less susceptible to interference, and/or by taking any other action as desired.

Various embodiments may additionally or alternatively detect the presence of infrared noise and provide visual, tactile, audio or other feedback when IR noise is present. Feedback as to presence and/or amount of IR noise detected by the remote control can be used to help the user avoid such noise sources, thereby improving operation and potentially reducing the number of customer complaints. Other uses and benefits may be realized as well, as described more fully below.

Turning now to the drawing figures and with initial reference to FIG. 1, an exemplary system 100 suitably includes a remote control 120 and a controlled device 102 that communicate via infrared signals 134 and 139. In various embodiments, remote control 120 is able to detect infrared noise 138 that may interfere with infrared control signals 134 and/or 139, and to take appropriate action to compensate for the noise and/or to indicate that noise is present. Compensation may take place in any number of different ways. The signal power used to transmit IR control signals 134 can be boosted when noise 138 is present, for example. Alternately, the timing of the signal transmission can be delayed or otherwise scheduled to occur at a time when the noise is not present, or when the noise is at a lower intensity. Still other embodiments may identify noise on a particular frequency, wavelength or other channel, and then select a different channel for signal transmission when noise is identified on the first channel. Some embodiments may alternately or additionally report the presence of detected noise 138 to controlled device 102, provide an indication of a noise level on the remote control 120, and/or or indicate the level of noise to a user, installer, customer service representative or the like in any other manner.

Controlled device 102 is any component, system or other device capable of receiving and processing infrared command signals 134 received from remote control 120. FIG. 1 shows an exemplary embodiment in which controlled device 102 is a set-top box (STB) or other receiver that receives television programming from a satellite, cable, terrestrial broadcast and/or other source and that presents received television imagery on a television or other display 104. Controlled device 102 could equivalently represent any other component, device or other feature that responds to infrared command signals 134 generated by remote control 120. Such devices may include, without limitation, any sort of home or office environmental features (e.g., lights, doors, fans, fireplaces), audio/video components of any sort, computer systems, video game systems, home or office appliances, and/or any other devices whatsoever that respond to infrared commands provided by a remote control 120.

FIG. 1 shows a remote control 120 that provides infrared command signals 134 to a set top box or other controlled device 102, and that receives infrared signals 139 from controlled device 102 or any other source. As mentioned above, in certain environments a television display 104 or other light source may produce infrared noise 138 that can interfere with desirable IR signals 134 and 139. Various embodiments of remote control 120 therefore detect the presence of noise 138 using IR receiver 136 or the like, and take appropriate action when noise 138 is present. In some embodiments, remote control 120 provides IR commands 134 to a controlled device 102 as a "one way" controller; it is not necessary that remote 120 also receive IR commands 139 from controlled device 102 or any other source in all implementations.

The exemplary remote control 120 shown in FIG. 1 suitably includes a processor 122, a memory 124, input/output features 126, an infrared transmitter 135, and an infrared receiver 136. Various embodiments of remote control 120 may additionally include a position sensing module 128, a radio frequency (RF) communications interface 131, a feedback module 127, and/or any other components and features as desired. Generally speaking, remote control 120 transmits infrared command signals 134 to controlled device 102 in response to button presses or other user inputs received from input/output module 126. Remote control 120 may also receive infrared messages 139 from controlled device 102 or any other source. The operations of remote control 120 are generally performed under the direction of software or firmware stored in memory 124 and executed by processor 122, although other embodiments may equivalently operate in part or otherwise under the direction of application specific integrated circuitry (ASICs) or any other hardware, software and/or firmware logic as desired.

Remote control 120 transmits and receives IR signals using IR transmitter 135 and IR receiver 136, respectively. Transmitter 135 and receiver 136 are shown in FIG. 1 to be combined as an IR transceiver 130, although other embodiments may implement IR transmit and receive functions using modules that are physically and/or logically separate from each other. IR receiver 136 suitably includes any sort of photodetector or the like that is capable of detecting wavelengths of light within the infrared spectrum. Conventionally, the IR receiver 136 is able to convert received IR light to electrical signals, and/or to quantize the electrical signals to electronic data that can be received and processed by processor 122.

Various embodiments of remote control 120 may also include an appropriate radio frequency (RF) interface 131 that supports wireless communications via antenna 132 or the like. In general, RF interface 131 will provide any appropriate hardware, software, firmware and/or other logic to support communications on a wireless network. In various embodiments, RF interface 131 implements a conventional IEEE 802.15.4 ("ZIGBEE") transceiver that is able to transmit and receive messages with other compatible transmitters and/or receivers, such as a transceiver in controlled device 102 and/or any gateway to network 110. Other embodiments may not be confined to IEEE 802.15.4 implementations, but may instead make use of any other wireless local area network (WLAN) or other short-range wireless signaling techniques such as IEEE 802.15.1 ("BLUETOOTH"), IEEE 802.11 ("WI-FI") and/or any other wireless communications techniques as desired.

In various embodiments, noise 138 can be detected on a real time (or near real time) basis, and noise measurements can be provided as feedback to a user, installer, customer service agent or the like. The detected level of IR noise may be provided as feedback directly from remote control 120, for example, using any sort of visual, audible, haptic, tactile or other feedback device 127 as desired. Examples of such embodiments may provide feedback using LEDs or similar lights (which may flash, progressively illuminate, change color and/or otherwise indicate signal quality in any manner), audible tones of varying intensity and/or pitch, tactile signals (e.g., vibrations of varying intensity or frequency), and/or the like. Providing feedback from the remote control 120 may allow the device to serve as a portable meter that allows different noise measurements to be detected in real time as the remote 120 is moved with respect to the controlled device 102. That is, the user (or other person holding the remote) may be able, in some embodiments, to receive instant feedback as to the quality of IR communications between the remote control 120 and the controlled device 102 as the remote 120 is moved around the room or other space. Certain embodiments may alternately provide feedback to the user when noise levels exceed desired levels (e.g., by illuminating a light when excessive noise is present). This feedback can serve as an indication to the viewer to move the remote control 120 to a different position, or to take other corrective action as appropriate.

RF interface 131 may also support sharing of messages that indicate the level of noise 138 detected by remote control 120 in any number of ways. In various embodiments, RF interface 131 allows remote control 120 to communicate with the controlled device 102, which may relay such information to a server 142 associated with a customer service agent or the like. That is, in some implementations remote control 120 may communicate over network 110 using controlled device 120 as a gateway. In such embodiments, remote control 120 suitably provides noise reports and/or other data to controlled device 101 via RF interface 131 or the like. Controlled device 102 then forwards or re-routes the received information to an appropriate recipient 142 on network 110 as desired. Controlled device 102 may additionally or alternately present the noise measurements on a display 104 in graphical, numeric or other form to provide feedback to the user or installer, as desired.

RF interface 131 may alternately facilitate communications with a gateway to a network 110 that would allow remote control 120 to communicate directly on network 110, if desired. In various embodiments, noise measurements from remote control 120 may be provided over network 110 to a remote computing system 142 for display, archival and/or other purposes. In various embodiments, a CSR or administrator may use the signal quality information to assist in determining a suitable position for device 102 and/or remote control 120, or for any other purpose. Feedback information may also be stored in a log, database or other repository that is associated with computer system 142, with device 102, or any other server as desired.

In various embodiments, remote control 120 is also able to determine its position in absolute or relative terms. Such embodiments may incorporate any sort of position sensor 128, such as any sort of global positioning system (GPS) receiver, or any sort of interferometric or similar sensor that would allow the use of dead reckoning techniques, and/or the like. Other embodiments may support triangulation of the position by processing signals received from multiple RF transmitters (e.g., wireless network or telephone access points), or using any other techniques. In embodiments that support position sensing, position information may be correlated to the levels of IR noise 138 that are measured at various positions to thereby improve identification of locations where IR communications are most effective. Position sensing is an enhancement feature that may be present in some embodiments, while other embodiments may omit such functionality entirely.

In operation, then, remote control 120 is able to detect infrared noise 138 received at IR receiver 136, to adjust the transmission of IR command signals 134, and/or to take other appropriate actions when such noise 138 is present. Various embodiments are able to update the noise detection in real time (or near real time) as new measurements are obtained, thereby allowing the user or installer to readily observe changes in noise 138 as device 102 and/or remote control 120 are moved with respect to each other. This feedback may be used, for example, to determine a more desirable location for the device 102 and/or the remote 120 during installation, maintenance or operation of device 102 and/or remote control 120.

Turning now to FIG. 2, an exemplary method 200 for operating a remote control 120 suitably includes the broad steps of receiving infrared light at the remote control (function 202) and detecting noise 138 in the received IR light (function 204). The detected noise 138 may be used to adapt an IR command signal 134 (function 208) generated by the remote control 120 (function 210) if the noise is excessive for the time, frequency and/or intensity of interest (function 206). The detected noise 138 may additionally or alternately be indicated (function 212) to a user, installer, CSR or the like. Various other functions or features may also be provided, as described in increasing detail below.

Infrared light is received at remote control 120 in any manner (function 202). Typically, IR light is received at a photodetector or other IR receiver 136 in remote control 120 that provides a digital or analog indication of the received IR light to processor 122 for further processing. IR light may be received on any continuous, periodic or other temporal basis, as desired. In various embodiments, noise level measurements may be obtained from received IR light in a diagnostic mode of remote control 120 in which an installer, user or other person uses the noise metrics to adjust the positions of device 102 and/or remote control 120. Other embodiments may determine noise levels on a real time or other more continuous basis, as desired.

The noise 138 present in the received IR light is measured in any manner (function 204). Generally speaking, the level of noise 138 in the received IR light is the amount of IR light that is not attributable to IR signals 134 or 139 that are sent or received by the remote control 120. That is, the noise 138 is the amount of detected IR energy that emanated from a source such as a television or other display that is not intending to provide IR signals to device 120. Noise 138, then, may be represented by the amount of IR light received at remote control 120 when no other signals 134 or 139 are being transmitted or received. Other embodiments may equivalently represent noise 138 using other techniques, as desired.

Measurements of IR light received at remote control 120 may be further processed in any manner. Multiple samples of the received IR light may be taken and averaged over time, for example, to arrive at a more consistent measurement as desired. Other sampling, smoothing and/or other filters may be applied as desired to arrive at any appropriate measure of the received IR light, which in turn may be correlated to a measure of noise 138 if no other signal 134, 139 is present when the received light is measured. Other embodiments may process multiple noise samples taken over time to identify periodic noise signals, or to quantify burst length, frequency, duty cycle and/or other parameters of noise 138, as desired.

In various embodiments, spurious IR light at particular frequencies or wavelengths of interest can be isolated from other noise 138. In such embodiments, time domain values of light intensity may be transformed into frequency domain equivalents in any manner, such as using a fast Fourier transform (FFT) or the like. Other embodiments may use multiple photodetectors (e.g., detectors tuned to different wavelengths of IR light) or any other light capture, sampling, filtering, signal processing and/or other techniques to isolate different wavelengths of interest. The wavelengths of interest may correspond, for example, to certain wavelengths used by the remote control 120 to transmit IR command signals 134 to the controlled device 102. Limiting calculations to particular wavelengths of interest may improve the accuracy of the noise measurement by reducing the impacts of noise 138 that may be present but that may not have significant adverse effects upon the remote control 120.

As noted above, the detected noise levels can be used for any number of purposes. In the example of FIG. 2, two different processing paths are shown. Functions 206, 208, 210 in FIG. 2 represent some embodiments of remote control 120 that automatically adapt IR command signals 134 if noise 138 is present. Function 212 represents alternate or additional features relating to indicating the level of noise 138 that was detected in function 204. Different implementations may equivalently provide either or both of these features. If both command adjustment and level indication are present, the two functions may be combined or executed in series or in parallel, as desired.

In some embodiments, one or more command signals 134 are adapted if the detected noise 138 is expected to undesirably interfere with the transmitted command. If noise is detected at a particular time, intensity and/or frequency (function 206), for example, one or more parameters of the command signal 134 may be adjusted (function 208) to avoid the detected noise 138. One way to determine if the noise 138 is expected to interfere with command signals 134 is to compare any parameter relating to the noise 138 detected in function 204 to an appropriate threshold value, as described below.

Function 206 therefore represents any comparison or the like used to determine whether command signals 134 should be adjusted. Various embodiments may simply compare the intensity of noise 138 with a maximum acceptable intensity of noise to determine if transmit power should be increased, or the like. In other embodiments, the comparison in function 206 may represent a comparison of maximum acceptable noise within particular constraints (e.g., for a particular wavelength of interest). Other comparisons may reflect time or period constraints (e.g., identifying a periodic noise signal so that commands can be transmitted during portions of the noise period when the noise is not present, or has a lower intensity). Still other embodiments may consider other factors (e.g., burst length, frequency, duty cycle and/or other parameters of noise 138) instead of noise intensity, as desired.

Any particular threshold values used in function 206 may be predetermined in any manner, such as through simulation, experimental results, trial-and-error, or the like. In other embodiments, the threshold may be dynamically determined during operation of the remote control 120. If the detected noise level detected by remote control 120 were to suddenly deviate substantially from an ambient or average noise level, for example, this deviation may warrant adapting of any commands 134 generated while the abnormal noise level persisted.

Other embodiments may determine threshold levels and/or perform comparisons between detected noise in any other manner. IR noise levels may be integrated over time, for example, and then compared to a threshold value that considers the appropriate time interval of the integration to avoid "false positives" caused by noise 138 that only occurs for a short duration of time. The threshold may also consider the intensities of light at particular wavelengths in embodiments that isolate IR noise at certain wavelengths of interest as described above. The threshold can therefore be predetermined or dynamically computed during operation to consider the particular light measurements that are obtained and processed within remote control 120.

If the detected noise exceeds acceptable noise levels (function 206), then IR command signals 134 generated and transmitted by remote control 120 (function 210) can be adapted as appropriate (function 208). In various embodiments, this adaptation 208 may involve directing the IR transmitter 135 to increase the transmit power, thereby resulting in an increase in the intensity of IR control signal 134. In other embodiments, the adaptation 208 may involve delaying the transmitting of the IR control signal 134 until after the noise 138 received at remote control 120 has decreased to more acceptable levels. This may correspond, for example, to simply waiting for a temporary noise 138 to subside, or for a user to move the remote control 120 to a position where less interference occurs. In other embodiments, command signals 134 may be transmitted at times that correlate to relatively quiet portions of periodic noise signals. That is, if a noise signal 138 is identified to be periodic, command signals 134 may be timed to take advantage of those portions of the noise period when the noise is less intense, thereby reducing the likelihood of interference.

Other embodiments could adjust the transmission of the control signals by providing the control signals 134 over a separate medium (e.g., a ZIGBEE, WIFI, RF4CE, BLUETOOTH or other wireless RF network) instead of using IR signaling if excessive IR noise is present. Such embodiments may use RF interface 131, for example, or any other communications interface that may be available to remote control 120.

Still other embodiments may select a new carrier frequency/wavelength or channel for transmitted IR command signals 134 based upon the noise detected at certain wavelengths. In such embodiments, the relative amounts of noise may be detected at two different wavelengths, and the less noisy wavelength may be selected to transmit subsequent commands, as desired. The detected noise may therefore be used as desired to adapt the timing, frequency/wavelength, intensity or any other parameter of subsequent IR signals 134 transmitted by the remote control 120. In many implementations, the IR command signal 134 is transmitted (function 210) without adaptation (e.g., at a conventional power level, time and/or channel) if the detected noise is not expected to interfere with signals 134 (e.g., if the noise level does not meet or exceed a threshold in function 206).

As noted above, some embodiments may additionally or alternatively indicate the noise 138 detected by the remote control 120 (function 212) to a user, installer, customer service representative, and/or the like. In various embodiments, the indication 212 may be provided on remote control 120 itself via visual, audible, haptic or other feedback generated by feedback device 127, as described above. Such embodiments may allow a person to use the remote control 120 as a handheld noise detector that provides feedback about noise presence and/or noise levels as the detector is moved within a room, building or other environment. As noted above, some embodiments may provide an indication that quantifies the noise level (i.e., that distinguishes between relatively higher and lower amounts of detected noise 138), whereas other embodiments may simply provide a light or other indicator when noise 138 is present. Other embodiments may indicate the noise level responsive to function 206 to allow the user to know when signal adaptation is occurring, or when any other noise threshold has been met or exceeded.

Other embodiments may indicate 212 the detected noise 138 by providing a message containing a measurement of the noise 138 to the controlled device 102. Noise reports may be provided via infrared signals 134, or via RF network interface 131 or any other media as desired. Controlled device 102 may display or store the noise reports in any manner. Noise level values may be stored in controlled device 102, for example, to allow for monitoring over time or for later review by a troubleshooter or other user, as desired. Noise reports may be alternatively or additionally presented as feedback to a user or technician. Information may be presented graphically, numerically or otherwise on display 104, for example. This feature may be particularly useful if remote control 120 lacks appropriate storage space and/or appropriate feedback capabilities 127.

Still other embodiments may equivalent or alternatively indicate 212 the detected noise 138 to a server 142 that is accessible via network 110. Noise measurements may be forwarded to server 142 from controlled device 102 in some implementations. Other implementations may allow remote control 120 to provide the noise reports directly to server 142 by allowing communication (e.g., via RF interface 131) on network 110. Noise reports may be provided in a batch mode at any time interval (e.g., daily, hourly, etc.), as requested by server 142 or another requester, or in real time as desired. Real transmission of noise reports from remote control 120 to server 142 may allow a remotely-located customer service agent to diagnose noise issues during a customer service call with the user, for example.

In some embodiments, noise reports may be correlated to the position of the remote control 120 as desired (function 214). If remote control 120 has position sensing feature 128 (FIG. 1), the noise levels detected at various positions can be monitored over time to identify positions where noise sources may have greater or lesser impacts upon IR communications. Position and noise data may be stored in any sort of data structure or other format. In embodiments that provide such features, correlation and storage of position and detected noise data may occur within remote 120, controlled device 102, server 142 and/or elsewhere as desired. This feature may be useful, for example, in determining appropriate locations for device 102 and/or remote control 120 since changes in signal strength can be readily observed as the device 102 and/or remote control 120 are moved relative to each other. This feature may be useful during installation, troubleshooting, maintenance and/or operation of device 102 and/or remote control 120.

Generally speaking, the various functions and features of method 200 may be carried out with any sort of hardware, software and/or firmware logic that is stored and/or executed on any platform. Some or all of method 200 may be carried out, for example, by logic executing within remote control 120 in FIG. 1. For example, various functions shown in FIG. 2 may be implemented as software or firmware logic that is stored in memory 124 and executed by processor 122. The particular logic and hardware that implements any of the various functions shown in FIG. 2, however, may vary from context to context, implementation to implementation, and embodiment to embodiment in accordance with the various features, scenarios and structures set forth herein. The particular means used to implement each of the various functions shown in FIG. 2, then, could be any sort of processing structures that are capable of executing conventional software logic in any format.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method of operating an infrared remote control, the method comprising:
receiving infrared light having a first wavelength at the infrared remote control;
detecting infrared noise in the infrared light having the first wavelength received at the infrared remote control;
sensing a position of the infrared remote control;
correlating the detected infrared noise with the sensed position of the infrared remote control; and
if the infrared noise detected when the infrared remote control is located in the sensed position exceeds a threshold, then adapting a subsequent transmission of an infrared command signal transmitted by the infrared remote control when the infrared remote control is again located in the same sensed position, wherein the adapting comprises changing the subsequent transmission so that the infrared noise detected in the infrared light having the first wavelength no longer interferes with the subsequent transmission of the infrared command signal transmitted by the infrared remote control.

2. The method of claim 1 wherein the detecting comprises identifying an intensity of the infrared light at the first wavelength prior to the subsequent transmission of the infrared command signal.

3. The method of claim 2 wherein the adapting comprises using a second wavelength to transmit the infrared command signal if the intensity of the infrared light at the first wavelength exceeds a threshold value.

4. The method of claim 1 further comprising providing an indication of the infrared noise by the infrared remote control.

5. The method of claim 4 wherein the providing comprises the infrared remote control providing a visual indication of the infrared noise in the received infrared light.

6. The method of claim 4 wherein the providing comprises the infrared remote control providing an audible indication of the infrared noise in the received infrared light.

7. The method of claim 4 wherein the providing comprises the infrared remote control transmitting the indication to a remote receiver via a digital communications network.

8. The method of claim 4 wherein the indication of the infrared noise in the received infrared light is updated in real time as the infrared remote control is moved.

9. A method of operating a remote control that provides infrared command signals to a controlled device, wherein the remote control comprises a position sensor and an infrared receiver, the method comprising:
receiving infrared light having a first wavelength by the infrared receiver of the remote control;
detecting a location of the remote control using the position sensor of the remote control;
analyzing the received infrared light by the remote control to identify an infrared noise in the infrared light received at the detected location;
repeating the receiving, detecting and analyzing at multiple locations of the remote control to thereby correlate identified levels of infrared noise with different locations of the remote control;
adapting a subsequent infrared signal generated by the remote control at locations having identified levels of infrared noise that exceed a threshold so that the infrared noise previously identified at the location of the remote control does not interfere with the subsequent transmission by the infrared remote control at the same location; and
transmitting the adapted subsequent infrared signal having the second wavelength to the controlled device.

10. The method of claim 9 wherein the subsequent infrared signal transmitted to the controlled device is one of the infrared command signals.

11. The method of claim 9 wherein the subsequent infrared signal transmitted to the controlled device is one of the infrared command signals, and wherein the adapting comprises using a second wavelength when the infrared noise exceeds a threshold.

12. The method of claim 11 wherein the subsequent infrared signal transmitted to the controlled device indicates the amount of infrared noise in the received infrared light to the controlled device.

13. A remote control configured to provide infrared command signals to a controlled device, the remote control comprising:
an infrared transmitter configured to generate the infrared command signals;
an infrared receiver configured to receive infrared light at a first wavelength;
a position sensor configured to detect locations of the remote control; and a processor coupled to the position sensor, the infrared transmitter and the infrared receiver, wherein the processor is configured to detect an infrared noise in the infrared light received by the infrared receiver at each of a plurality of positions of the remote control, to correlate amounts of infrared noise in the infrared light to the locations of the remote control that are detected by the position sensor, and to adapt the subsequent infrared command signals generated by the infrared transmitter in response to the amount of noise in the infrared light previously detected at the location of the remote control so that the infrared noise that was previously detected at that location does not interfere with the subsequent infrared transmission by the infrared remote control at the same location.

14. The remote control of claim 13 further comprising a feedback device, and wherein the processor is configured to indicate a level of the infrared noise in the infrared light received by the infrared receiver on the feedback device.

15. The remote control of claim 14 wherein the processor is configured to update the indication of the level of noise in the infrared light in real time as the remote control is moved.

16. The remote control of claim 13 further comprising an interface to a wireless network based upon radio frequency signals transmitted separately from the infrared command signals, and wherein the processor is configured to transmit a message that indicates an amount of the infrared noise in the infrared light received by the infrared receiver to a recipient on the wireless network.

* * * * *